United States Patent [19]

Lewus

[11] Patent Number: 4,675,565
[45] Date of Patent: Jun. 23, 1987

[54] CAPACITOR-START PARALLEL RESONANT MOTOR

[76] Inventor: Alexander J. Lewus, 9844 N. 11th Ave., Phoenix, Ariz. 85021

[21] Appl. No.: 869,291

[22] Filed: Jun. 2, 1986

[51] Int. Cl.$^4$ .................. H02K 11/00; H02P 1/44
[52] U.S. Cl. .................. 310/68 R; 310/68 E; 318/786; 318/793; 318/794
[58] Field of Search .............. 310/68 R, 72, 68 E; 318/785, 786, 787, 789, 790, 793, 794, 795, 817, 816; 361/29

[56] References Cited

U.S. PATENT DOCUMENTS

| | | | |
|---|---|---|---|
| 2,028,230 | 1/1936 | Lyden | 318/795 |
| 2,836,780 | 5/1958 | List, Jr. et al. | 318/795 |
| 3,036,255 | 5/1962 | Lewus | 318/221 |
| 3,573,579 | 4/1971 | Lewus | 318/221 |
| 3,916,274 | 10/1975 | Lewus | 318/221 |

FOREIGN PATENT DOCUMENTS 518093 2/1940 United Kingdom ............... 318/816

Primary Examiner—Patrick R. Salce
Assistant Examiner—D. L. Rebsch
Attorney, Agent, or Firm—LaValle D. Ptak

[57] ABSTRACT

An electric current motor is operated from a single phase of alternating current power source, and functions with low surge operation at motor start. The motor includes first and second windings of substantially the same wire size angularly displaced from one another 90° electrical on a stator core and inductively coupled to a rotor. A capacitor is connected in parallel with one of the windings to form an LC resonant circuit at the operating frequency of the motor. A second starting capacitor is connected in series with a switch in parallel with the first capacitor. The switch is normally closed during starting of the motor and is opened during normal load conditions.

24 Claims, 12 Drawing Figures

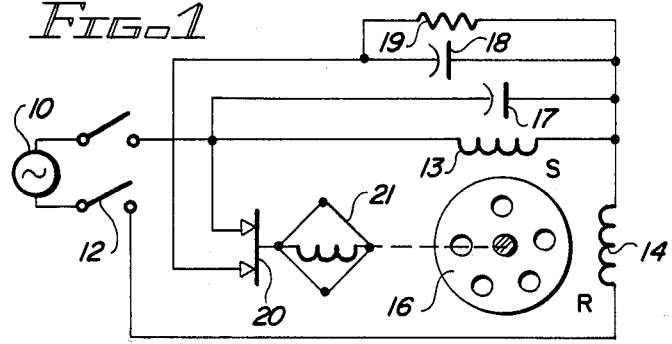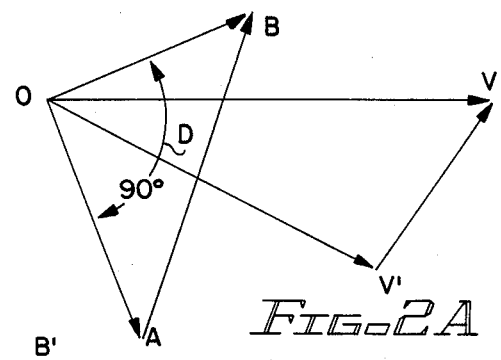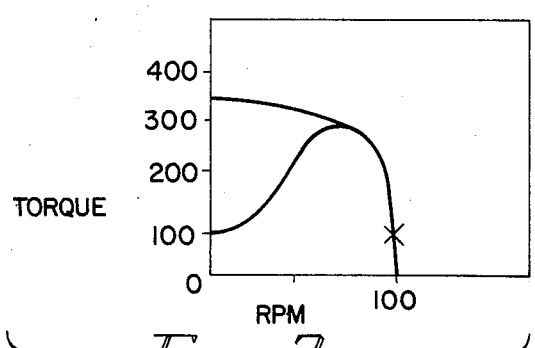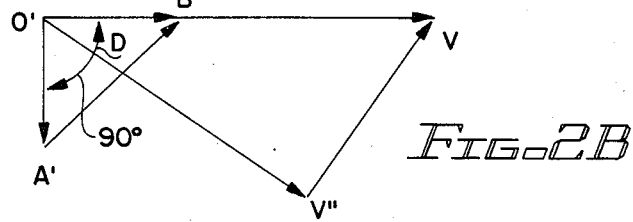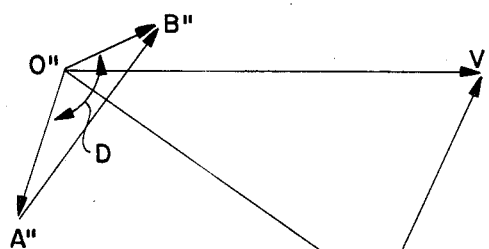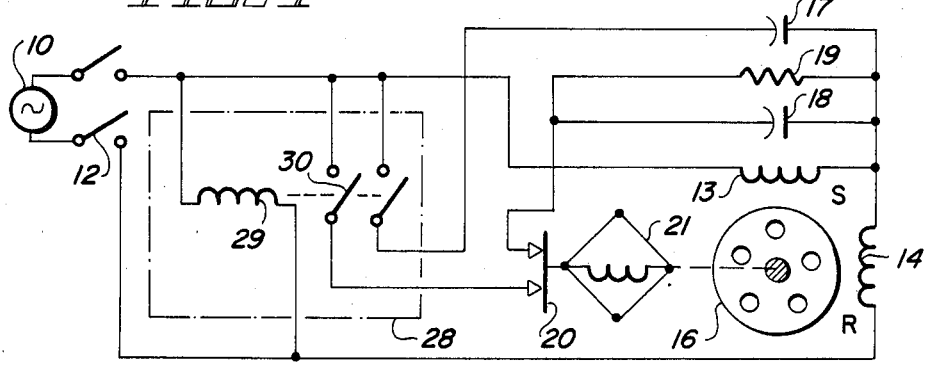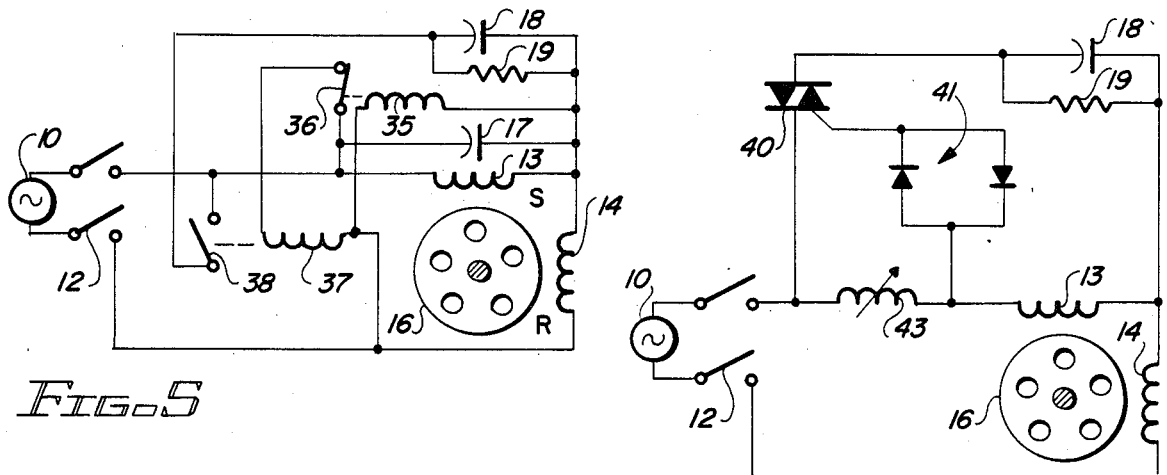

CAPACITOR-START PARALLEL RESONANT MOTOR

RELATED APPLICATION

This application is related to co-pending application Ser. No. 855,935 filed by applicant on Apr. 25, 1986.

BACKGROUND

Single-phase alternating current electric motors conventionally are provided with two windings on a stator core, inductively coupled to the rotor of the motor. The windings generally constitute a starting winding (of relatively small diameter wire) and a run winding (of relatively large diameter wire compared to the starting winding) angularly displaced from one another on the stator. In capacitor-start and capacitor-start/capacitor-run motors, a starting capacitor is connected in series with the starting winding and a switch. At motor start-up, the switch is closed and the capacitor, in conjunction with the starting winding, is selected to produce a leading current in the start winding which is approximately equal to and approximately 90° displaced in phase from the lagging current in the main or run winding of the motor. Such arrangements produce high values of starting torque with lower starting current than are obtained with other types of split-phase phase motors.

Usually, the switch in a capacitor-start motor is a centrifugal or thermal switch connected in series with the capacitor and start winding across the input terminals. The run winding then is connected in parallel with this series-connected starting circuit. In such capacitor start motors, the starting condition is such that the instantaneous locked rotor current is high and the motor starting current demand factor also is high. As a consequence, such motors undergo relatively high operating temperatures and require some type of switch for disconnecting or opening the starting winding circuit after a pre-established rotational speed of the rotor is reached. Because the starting winding of such motors generally is of relatively small diameter wire, over-heating can, and frequently does occur. Such overheating results in a relatively limited life of the starting winding due to burn out, particularly under overload conditions of operation of the motor.

Applicant's above mentioned co-pending application is directed to capacitor-start/capacitor-run motors which do not employ switches in the starting circuit, but which instead utilizes two series-connected windings (of substantially the same diameter heavy wire) electrically phase displaced 90° from one another on the stator core. One of these windings has a capacitor connected in parallel with it to form a parallel resonant circuit at the operating frequency of the motor. The motor of this co-pending application is a high efficiency motor which overcomes most of the disadvantages of the prior art capacitor-start/capacitor-run motors. One disadvantage, however, which is present in the motor of the above identified co-pending application is that the starting torque of the motor is relatively low. As a consequence, applications for the motor of applicant's co-pending application are primarily for situations which do not require a very high starting torque, such as pumps, blowers, machine tools, and many commercial and domestic appliances.

Applicant also has three patents directed to single phase motors of the capacitor-start type directed to starting control circuits for motors producing high starting torque. These patents are U.S. Pat. Nos. 3,036,255; 3,573,579; and 3,916,274. The '255 patent is directed to a capacitor motor using either a centrifugal or relay operated switch in the starting circuit to open the capacitor starting circuit to disconnect it and the start winding from the motor operation during normal load conditions of operation of the motor.

U.S. Pat. Nos. '579 and '274 both are directed to solid state motor starting control circuits which do not employ mechanical switches. As a consequence, arcing, which is associated with mechanical switches, and the inherent shortcomings of mechanical switches, such as centrifugal switches, are overcome by the solid state circuitry used in the starting control circuit of these two patents. These patents, like other prior art for capacitor-start motors, however, have a starting capacitor connected in series with a start winding and the switch; so that starting current is applied through the start winding only during the start-up portion of operation of the motor. Once the motor reaches or nears operating running speed, the solid state switch creates an open circuit condition in the starting circuit; and the starting winding is removed from further operation. Consequently, such a solid state motor starting control circuit functions in a manner similar to the mechanical switch circuits of the prior art to control the connection and disconnection of the starting winding from the power input terminals in accordance with the particular state of operation of the motor.

It is desirable to provide a motor which has the advantages of the parallel resonant motor of the above identified co-pending application and which further is capable of producing a high starting torque, to permit use of such a motor in applications where the motor of applicant's above identified co-pending application is not suitable.

SUMMARY OF THE INVENTION

Accordingly it is an object of this invention to provide an improved alternating current motor.

It is another object of this invention to provide an improved alternating current motor operated from a single phase alternating current power source.

It is an additional object of this invention to provide an improved single phase alternating current motor which operates at high efficiency, low starting current, and low running current.

It is a further object of this invention to provide an improved parallel resonant alternating current motor capable of producing high starting torque.

In accordance with a preferred embodiment of this invention, an alternating current motor operated from a source of single phase alternating current power has first and second windings angularly displaced from one another substantially 90° on a stator core and inductively coupled to a rotor. The windings are connected in electrical series circuit with one another. A first capacitor is connected in parallel with the first winding to form an LC resonant circuit with the first winding at the frequency of alternating current power applied to the motor. A second capacitor is connected in series with a switch in parallel with the first capacitor. The switch is closed during start-up of the motor and is opened during normal load conditions of operation of the motor.

BRIEF DESCRIPTION OF THE DRAWINGS

FIG. 1 is a schematic diagram of a preferred embodiment of a motor according to the invention;

FIG. 2A through 2C are vector diagrams of operating conditions of the motor shown in FIG. 1;

FIG. 3 is a curve illustrating the relative starting and running torque of the motor of FIG. 1;

FIGS. 4 through 7 are schematic diagrams of other embodiments of motors according to the invention.

DETAILED DESCRIPTION

Figure 7:
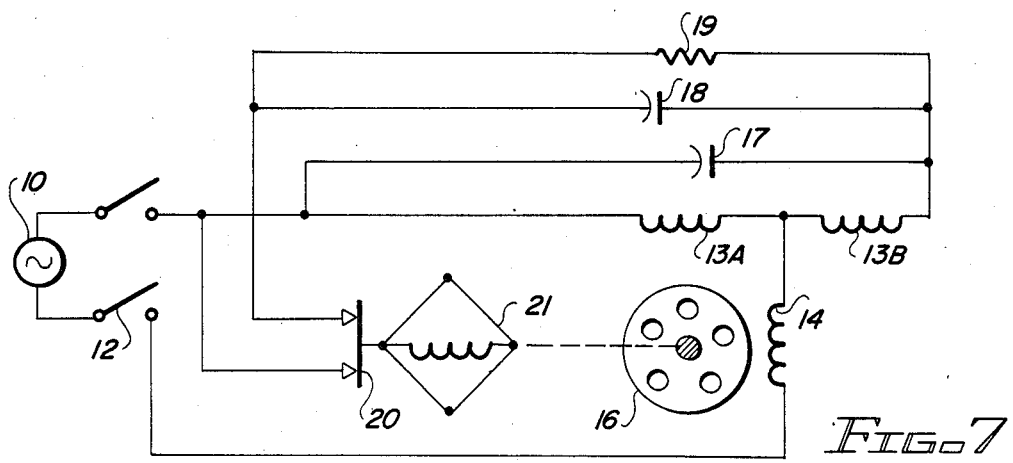

Reference now should be made to the drawings where the same reference numbers are used in the different figures to designate the same or similar components.

FIG. 1 is a schematic diagram of a two-phase capacitor motor, adapted to be operated from a single phase alternating current source and which incorporates the principles of the invention. The motor shown in FIG. 1 employs an LC resonant circuit of the type disclosed in my above mentioned co-pending application. The motor of FIG. 1, however, also functions to develop substantially higher starting torque than the motors of my above identified application. In FIG. 1, single phase alternating current power is supplied from a suitable source 10 through a double-pole, single-throw power switch 12. A pair of windings 13 and 14 are wound on the stator core with substantially 90° electrical angular displacement between them, and these windings are connected in series with one another across the power input terminals of the switch 12. Although the winding 13 is designated as a "start" (S) winding and the winding 14 is designated as a "run" (R) winding, the windings are essentially the same. The windings 13 and 14 both are wound from relatively heavy wire (of a gauge commonly used for the run winding of such electric motors), so that the characteristics of the two windings 13 and 14 are similar.

A capacitor 17 is connected in parallel with the winding 13 and forms a parallel LC resonant circuit with the winding 13, the resonance of which is selected to be at or near the 60 Hz frequency of the power supply 10. Obviously, if power supplies of different frequencies, such as 50 Hz or 120 Hz are used, the resonance of the LC parallel resonant circuit, consisting of the winding 13 and the capacitor 17, is selected to match the frequency of the source 10. The capacitor 17 is an alternating current non-polarized capacitor, and may be an electrolytic capacitor.

The winding 13 and 14 are inductively coupled to a rotor 16 which may have any one of a number of different standard configurations. For example, the rotor 16 may be a squirrel cage rotor, a high resistance rotor, a low resistance rotor, a wound rotor, or a multiple two-winding high and low resistance rotor.

The system which has been described thus far is comparable to the one disclosed in my co-pending application. Such a motor, as described in my co-pending application, does not produce a very high starting torque. In order to increase the starting torque, a second capacitor 18 (a non-polarized AC electrolytic type) is connected in parallel with the capacitor 17 through the contacts of a starting switch 20. The result of the second capacitor 18 in parallel circuit with the capacitor 17 is to cause the phase displacement of the currents through the windings 13 and 14 to be in the vicinity 90° phase displacement during motor starting conditions. In addition, the overall current demand of the motor at start-up is greater than that with the motor of my co-pending application. Once the motor attains or approaches its normal operating speed, a centrifugal switch 21 coupled to the rotor 16 opens the contacts 20 and removes the capacitor 18 from the circuit. An energy dissipating resistor 19 is connected across the capacitor 18 for the purpose of dissipating any energy stored in the capacitor 18 at the time the switch 20 opens.

FIGS. 2A through 2C illustrate, respectively, the vector diagrams for the motor of FIG. 1 at start, full load, and no load conditions of operation. In FIG. 2A, the motor starting condition, the vector voltage from zero to V is a single phase line reference voltage. The voltage from zero to V' is the first phase voltage (the voltage in winding 13), and the second phase voltage (the voltage across the winding 14) is from the vector V' to V.

The current vectors, at motor start-up are dephased or out-of-phase by approximately 90° to produce a high starting torque. This dephasing is a result of the combined capacitance of capacitors 17 and 18. The relative capacitance of the capacitors 17 and 18 is such that the capacitance of the start capacitor 18 is considerably higher than the capacitance of the capacitor 17. In a typical motor of the type shown in FIG. 1, the capacitor 17 may have a capacitance of 100 microfarads and the capacitor 18 may have a capacitance of 400 microfarads. The composite effect of this capacitance upon the starting current is illustrated in FIG. 2A.

The starting current through the first phase winding (the starting winding 13) is illustrated in FIG. 2A as from zero to A. The composite capacitor current vector at start, which is the result of the capacitances of both capacitors 17 and 18, is from A to B (leading the voltage vector zero to V' by approximately 90°. Therefore the resultant current vector through the second phase winding (the run winding 14) is from zero to B. This resultant current vector constitutes the sum total of the current drawn from the single phase power source 10 during the motor starting conditions. This phase displacement of the current vectors develops high motor starting torque. As is apparent from a subsequent comparison of FIG. 2A with FIGS. 2B and 2C, this starting current is higher than the full load and no load currents; but it still is a relatively low current in comparison with prior art motors not employing the parallel resonant circuit formed by the winding 13 and the capacitor 17.

FIG. 2B illustrates the voltage and current vectors for the motor of FIG. 1 operating at full load conditions. As described previously, under full load conditions, the switch 20 is opened and the capacitor 18 no longer is connected in the circuit. Consequently, the capacitor 17 is the only capacitor in parallel with the first phase winding 13 to form the parallel resonant LC circuit during normal full load operating conditions. The vector from O' to V is the voltage reference vector single phase power available from the source 10. The voltage vector from O' to V" is the first phase voltage of the winding 13, and the second phase voltage of the winding 14 is from V" to V.

The current vectors under full load conditions of operation, as illustrated in FIG. 2B, are shown in the resultant vector from O' to B'. This is a resultant of the vector sum current of the first phase current vector O' to A' and the capacitor current vector A' to B'. It may be seen that the vector O' to B' is relatively short (low current) and is at or near unity power factor, resulting in high efficiency. The angle D (90°) is the phase displacement of the current vectors during motor full load running condition. As is apparent from an examination of FIGS. 2A and 2B, the phase displacement of the current vectors is substantially 90° during starting and during full load operating conditions. Under full load operating conditions, with the capacitor 18 disconnected, the operation of the motor of FIG. 1 essentially is the same as the motors described in my above mentioned co-pending application.

FIG. 2C shows the voltage and current vectors of the motor of FIG. 1 operating at no load. Under this condition of operation, the switch 20 is open and the capacitor 18 is not in the circuit. Parallel resonance of the winding 13 and the capacitor 17 takes place; so that the capacitor current and the winding current through the winding 13 is relatively high, while the current through the winding 14, which may be considered the run winding, is relatively low. The voltage vectors O''' to V'''' through the winding 13, and the voltage vector V'''' to V through the second phase winding 14 create the resultant vector O'' to V. A considerable difference in the current vectors from the full load condition shown in FIG. 2B is apparent. The current vector of the winding 13, O'' to A'' and the current vector of the capacitor 17 A'' to B'' are fairly large; but because of the parallel resonance of the winding 13 and the capacitor 17, the current vector O'' to B'', through the second phase or run winding 14, is quite short.

An actual motor modified to have the winding configuration illustrated in FIG. 1 and from which the information providing the basis for the vector diagrams of FIGS. 2A through 2C was constructed. The motor was a standard General Electric motor, Frame 182, Model No. 5ks182AC287. This was a one horsepower motor, 1715 rpm, 208 volts, 7.2 amps. The stator was rewound in accordance with the configuration of FIG. 1, with No. 16 wire for both windings 13 and 14. In addition, the winding which was used as the run winding in the original motor was employed as the start winding 13 and the rewound start winding was used as the run winding 14. Since the windings are of the same gauge wire, this can be accomplished. The run winding 14 had a greater turns ratio with respect to the start winding 13. The table reproduced below indicates measurements which were taken at start, full load, and no load conditions of operations (allowing approximately 2% to 5% +/− meter accuracy readings):

ing of the starting currents equals approximately 90°. This phase displacement develops a very high motor starting torque for the motor. In addition, for the run condition (full load) it may be seen that the Angle D also is approximately 90°. The result is that the resultant current vector O' to B' is relatively low and that the current is at or near unity power factor as drawn from the single phase source of power. This results in high efficiency of operation.

At starting conditions, the motor of the above table developed 11 ft.lbs. of starting torque. At full load or running condition, the motor developed one horsepower at 3 ft.lbs. of torque at 5.5 amperes of current at 1740 rpm. The breakdown torque from the motor full load to stalling is in the vicinity of 8.5 ft.lbs. The motor, as originally designed, draws 7.2 amperes for its 1 horsepower output; so that the modified winding configuration employing the parallel resonance combination of the capacitor 17 and the winding 13 results in significantly higher efficiency during the full load or running condition of operation of the motor.

FIG. 3 is an output curve of the increasing rpm from 0 to maximum (1740 rpm) versus torque of the motor shown in FIG. 1 and having the characteristics illustrated in the above table. The "X" on FIG. 3 indicates the relative torque at full load operating conditions. The maximum rpm is shown for the no load condition. The lower curve in FIG. 3 illustrates the effect on the rpm versus torque which is contributed by the parallel resonant circuit of the capacitor 17 and the winding 13. The upper curve is the composite effect which is provided by the addition of the starting capacitor 18. As is readily apparent, the upper or composite curve provides a very high starting torque at low rpms. To achieve the efficiency of continuous operation from the LC resonant circuit, once motor start-up has been attained, the capacitor 18 is disconnected or removed from the circuit; and the remainder of the curve of FIG. 3 then is effected during run and no load conditions by the parallel resonant circuit comprising the winding 13 and the capacitor 17.

FIGS. 4 through 7 illustrate other circuit configurations which employ the same principles of the embodiment of the invention shown in FIG. 1, but which employ different circuitry or which add other characteristics to the embodiment which has been described. For example, FIG. 4 adds an additional feature of a power relay 28 to the circuit of FIG. 1 for the purpose of eliminating the effect of the capacitor voltage discharge CEMF (Counter Electromotive Force) induction from

TABLE

|  | Single Phase Power Input | First Phase Winding (13) | Second Phase Winding (14) | Start Cap. (18) 400 MFD | Run Cap. (17) 100 MFD | Total Run-Start Cap. |
|---|---|---|---|---|---|---|
| Start Peak *A | 23 A | 25 A | 23 A | 27.0 A | 7.5 A | 34.5 A |
| Run A | 5.5 A | 4 A | 5.5 A | 0 | 7.5 A | 7.5 A |
| No Load A | 3.6 A | 5.5 A | 3.6 A | 0 | 8.5 A | 8.5 A |
| Start *V | 225 V | 200 V | 100 V | 200 V | 200 V | 200 V |
| Run V | 230 V | 200 V | 130 V | 0 | 200 V | 200 V |
| No Load V | 230 V | 220 V | 130 V | 0 | 220 V | 220 V |
| *PF Start | 93% | 72% | 80% | 0 | 0 | 0 |
| PF Run | 80% | 55% | 95% | 0 | 0 | 0 |
| PF No Load | 36% | 5% | 100% | 0 | 0 | 0 |

Key:
*A — Amperes
*V — Volts
*PF — Power Factor

From the measured currents of the motor shown in the above table, the Angle D (FIG. 2A) for the dephasing of the starting currents equals approximately 90°.

the motor upon turnoff of the motor when the switch 12 is opened. The relay 28 is connected across the terminals of the switch 12 and has a pair of contacts 30, a different one of which is connected in series with the circuit of the capacitors 17 and 18. When the switch 12 is initially closed, current flows through the operating coil 29 of the relay 28 to close the contacts 30. This provides operating current to both of the capacitors 17 and 18 (for the capacitor 18 through the closed contacts of the switch 20). The contacts 30 remain closed during the entire motor operation.

As the motor of FIG. 4 is deenergized by opening the switch 12, operating current through the relay coil 29 ceases; and the contacts 30 open. This causes the circuits for both of the capacitors 17 and 18 to be opened. This prevents the surge voltage resulting from the discharge of the capacitor 17 from being applied to the motor windings 13 and 14. As a result, unnecessary vibration of the motor at disconnect, as well as the noise created by such vibration, is eliminated. In addition, the relay 28 causes elimination of the dynamic braking of the motor when the capacitors 17 and 18 are discharged at the instant of motor disconnection. As a consequence, the motor decelerates to a stop silently and without vibration. This increases the life of the motor, especially for large horsepower integral motors.

FIG. 5 is another variation of the embodiment of FIG. 1. In this arrangement, a voltage sensitive relay coil 35 operates to control contacts 36 for the purpose of connecting and disconnecting the starting capacitor 18 from the circuit. This operation is controlled by the voltage of the motor at its starting and running conditions. The voltage sensitive relay, comprising the coil 35 and contacts 36, is a small size relay; and the contacts 36 normally are closed when the motor is in its off condition of operation and during start-up.

The contacts 36 are connected in series with the operating coil 37 of the power relay across the input terminals controlled by the switch 12. Consequently, when the contacts 36 are closed, operating current for the coil 37 flows through those contacts from the source 10. This closes contacts 38 to connect the start capacitor 18 into the circuit. The arrangement of FIG. 5 is very practical for large integral horsepower motors.

As the motor attains its run voltage, the voltage across the relay coil 35 increases; and it operates to open the contact 36. This in turn removes operating current from the coil 37; so that the contacts 38 are opened. The capacitor 18 then is disconnected from the circuit, and the motor continues operation in its run mode of operation in the same manner as described above in conjunction with FIG. 1. The advantages of the circuit of FIG. 5 is that the circuit suppresses the capacitor voltage discharge upon disconnection of the operating current to the motor by opening up the switch 12. No mechanical contacts of the type required for the switch 20/21 are necessary, so that increased life of the motor and the starting circuit results. The power relay 37/38 has contacts 38 capable of handling heavy high current from the capacitor 18 as it is switched into and out of the circuit.

Another embodiment which does not require a mechanical switch is illustrated in FIG. 6. Only a single capacitor 18 is used in this embodiment, and the capacitor 17 has been eliminated. In FIG. 6, the centrifugal switch 20/21 has been replaced with a solid state motor starting control circuit of the type disclosed in applicant's U.S. Pat. No. 3,916,274. This circuit comprises a triac 40 connected in series with the starting capacitor 18 to function as the on/off switch in that circuit. The gate of the triac 40 is connected to a pair of parallel back-to-back diodes in a circuit 41. These diodes control the gate voltage for the triac 40 in accordance with the voltage drop across a variable inductor 43. The circuit of FIG. 6 operates to connect the capacitor 18 in the circuit during the relatively high current starting conditions and operates to disconnect the capacitor 18 from the circuit during normal full load or no load operating conditions. Reference should be made to U.S. Pat. No. 3,916,274 for a complete description of the operation of this solid state motor control switching circuit.

The capacitor 18 in the embodiment of FIG. 6 is selected to form an LC parallel resonant circuit with the winding 13 during the starting phase of operation of the motor shown in FIG. 6. Consequently, during motor start-up, parallel resonance continues to be employed. At the time the capacitor 18 is switched out of the circuit, operating current for the motor continues to flow through both windings 13 and 14. The windings are connected in series with the source of alternating current power 10 through the switch 12 at all times during the operation of the circuit. There is no "start winding" which is switched out of the circuit as is common with prior art capacitor start motors.

The first winding 13 of the motor of FIG. 6 has a greater to number of turns than the second winding 14, with both windings using the same large wire size of low impedance. The winding 14 has about one-third or one-fourth the turns ratio of the winding 13. The motor of FIG. 6 develops the same horsepower output during its running condition, with a much lower temperature rise, than comparable prior art capacitor start motors. There is no starting winding to burn out, and the motor draws a relatively low starting current.

FIG. 7 illustrates another embodiment which is similar to the one of FIG. 1, but in which the first phase winding 13 comprises a center tapped winding including two sections 13A and 13B. The connection between the sections 13A and 13B comprises the upper connection to the winding 14 of the motor. The capacitors 17 and 18 are connected in parallel with both sections 13A and 13B of the start winding to form a parallel resonant circuit with both winding sections. The nature of the current flow through the windings 13A and 13B and the capacitors 17 and 18 is such that the capacitors 17 and 18 also are connected in electrical series with the winding section 13B and the winding 14. This assists in utilizing the capacitor leading current for increased starting torque in conjunction with the winding section 13B.

The operation of the circuit of FIG. 7 is otherwise the same as in FIG. 1. The circuit of FIG. 7, however, produces an even higher starting torque and motor pull-in torque than the motor shown in FIG. 1. The same motor and the same frame used in the example of FIG. 1 were wound with the configuration of FIG. 7. The capacitor 17 was a 70 microfarad capacitor and the capacitor 18 was a 500 microfarad capacitor. The motor developed a starting torque of 14.5 ft.lbs. at 38 amperes, and the motor pull-in torque was 8.5 ft.lbs. at 13 amperes. At full load, the motor produced 3 ft.lbs. of torque at 1750 and the breakdown torque was 9 ft.lbs up to 1600 rpm.

Figure 8A:
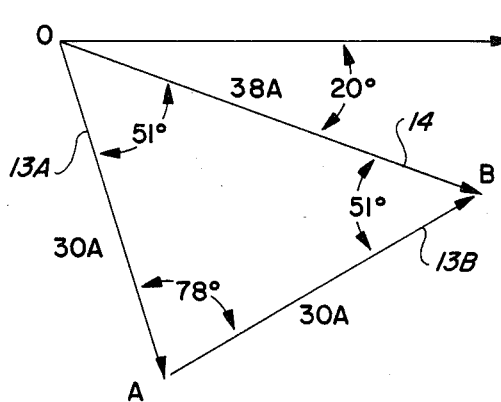
FIGS. 8A through 8C are vector diagrams of operating conditions of the motor shown in FIG. 7.
Figure 8B:
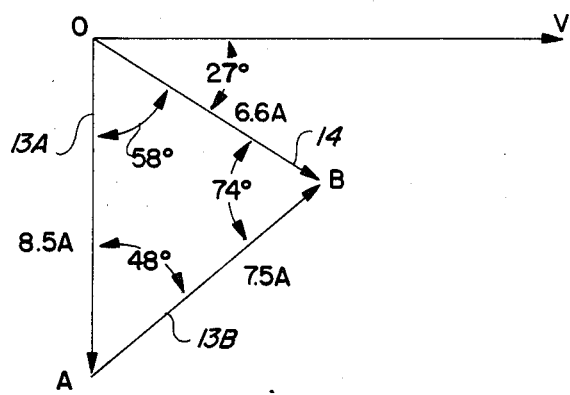
Figure 8C:
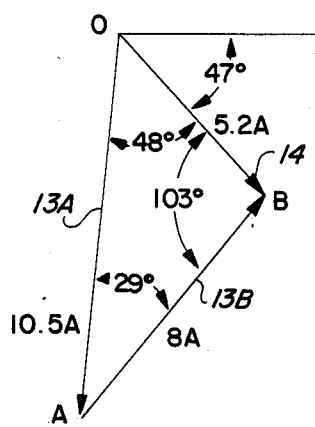

FIGS. 8A through 8C illustrate the vector diagrams for the motor of FIG. 7 at start, full load, and no load conditions of operation respectively. The individual voltage vectors have not been illustrated, but the resultant reference line voltage vector V is shown in each of these three figures.

For the most efficient operating conditions of the motor of FIG. 7, it is desirable to have all of the current vectors equal in length, to produce an equiangular or equilateral triangle. For the motor of FIG. 7, this is readily apparent from a reference to the vectors of FIGS. 8A and 8B. FIG. 8A shows the current conditions at motor start and FIG. 8B shows the conditions at normal full load operation at 1750 rpm. At no load conditions of operation, the equilateral triangle effect is not present, as is apparent from an examination of FIG. 8C.

The foregoing description has been directed to several different specific embodiments of the invention. Various changes and modifications may be made to those embodiments by those skilled in the art without departing from the true scope of the invention. For example, only a limited number of winding configurations and starting switch circuits have been illustrated. Others may be employed. It also is possible to provide a reversing switch for the motor to permit it to instantly reverse direction under either no load or full load conditions. The underlying principle of the invention, that of using a parallel resonant LC circuit comprising of the start winding an a capacitor, along with a relatively high capacitance start capacitor for providing high starting torque may be employed in a variety of stator winding configurations.

I claim:

1. An alternating current motor for operation from a source of single phase alternating current power and having first and second windings electrically angularly displaced from one another substantially 90° on a stator core and inductively coupled to a rotor, said motor including in combination:
   means for connecting said first and second windings in electrical series circuit with one another;
   means for applying single phase alternating current power to said series-connected first and second windings throughout the starting and running operation of said motor;
   first capacitor means connected in parallel with said first winding to form an LC resonant circuit therewith at the frequency of alternating current power applied by said means for applying alternating current power;
   second capacitor means;
   switch means connected in series with said second capacitor means;
   means for connecting said series-connected switch means and second capacitor means in parallel with said first capacitor means; and
   means coupled with said switching means for causing said switch means to be closed during starting of said motor and to be opened during normal load conditions of operation of said motor.

2. The combination according to claim 1 wherein the capacitance of said second capacitor means is substantially greater than the capacitance of said first capacitor means.

3. The combination according to claim 2 wherein said first and second windings are wound with wire of substantially the same size.

4. The combination according to claim 3 wherein the parameters of said first and second windings, said stator core, and said first capacitor means are selected to cause said stator core to be operated at a flux density near saturation.

5. The combination according to claim 3 wherein said switch means is a normally closed centrifugal switch coupled with the rotor of said motor ; so that upon attainment of a predetermined rotational speed of said rotor, said switch means is opened to disconnect said second capacitor means from the circuit.

6. The combination according to claim 3 wherein said switch means comprises a AC bi-directional semiconductor switch having first and second electrodes operatively connected in series circuit with said second capacitor means, and having a gate electrode for triggering said switch between a conductive state and a non-conductive state, said semiconductor switch including a current-sensitive control device connected in series with said first winding and said means for applying alternating current power, and further bias-variable impedance means coupled with said current sensitive control device and said gate electrode for triggering said semiconductor switch from a conductive during motor starting to a non-conductive state during normal load conditions of operation of said motor.

7. The combination according to claim 1 wherein said first and second windings are wound with wire of substantially the same size.

8. The combination according to claim 1 wherein the parameters of said first and second windings, said stator core, and said first capacitor means are selected to cause said stator core to be operated at a flux density near saturation.

9. The combination according to claim 1 wherein said first winding comprises a plurality of first windings connected in series with one another and wherein said first capacitor means is connected in parallel with said plurality of first windings.

10. The combination according to claim 1 wherein said first winding has a center tap and said second winding is connected to said center tap on said first winding.

11. The combination according to claim 10 wherein the capacitance of said second capacitor means is substantially greater than the capacitance of said first capacitor means.

12. The combination according to claim 1 wherein said switch means is a normally closed centrifugal switch coupled with the rotor of said motor ; so that upon attainment of a predetermined rotational speed of said rotor, said switch means is opened to disconnect said second capacitor means from the circuit.

13. The combination according to claim 12 wherein the capacitance of said second capacitor means is substantially greater than the capacitance of said first capacitor means.

14. The combination according to claim 1 wherein said switch means comprises a AC bi-directional semiconductor switch having first and second electrodes operatively connected in series circuit with said second capacitor means, and having a gate electrode for triggering said switch between a conductive state and a non-conductive state, said semiconductor switch including a current-sensitive control device connected in series with said first winding and said means for applying alternating current power, and further bias-variable impedance means coupled with said current sensitive control device and said gate electrode for triggering said semiconductor switch from a conductive during motor starting to a non-conductive state during normal load conditions of operation of said motor.

15. The combination according to claim 14 wherein the capacitance of said second capacitor means is substantially greater than the capacitance of said first capacitor means.

16. The combination according to claim 1 wherein said means for causing said switch means to be closed and opened includes a power relay coupled to said means for applying single phase alternating current power for operation thereby , said relay including contacts connected in series circuit with each of said first and second capacitor means, said power relay causing said contacts to be closed whenever said alternating current power is applied to said first and second windings.

17. The combination according to claim 1 further including a voltage sensitive relay connected is parallel with said second winding for operating said switch means, wherein said voltage sensitive relay causes said switch means to be closed during starting of said motor and to be opened during normal load conditions of operations of said motor.

18. An alternating current motor for operation from a source of single phase alternating current power and having first and second windings electrically angularly displaced from one another substantially 90° in a stator core and inductively coupled to a rotor, said motor including in combination:

means for connecting said first and second windings in electrical series circuit with one another;

means for applying single phase alternating current power to said series-connected first and second windings throughout the starting and running operation of said motor;

capacitor means;

switch means connected in series with said capacitor means;

means for connecting said series-connected switch means and capacitor means in parallel with said first winding to form an LC resonant circuit therewith at the frequency of alternating current power applied by said means for applying alternating current power; and means coupled with said switch means and responsive to the operating condition of said motor for causing said switch means to be closed during starting of said motor and to be opened during normal load conditions of operation of said motor.

19. The combination according to claim 18 wherein said capacitor means is an electrolytic non-polarized alternating current capacitor.

20. The combination according to claim 18, wherein said first winding has a greater number of turns than said second winding.

21. The combination according to claim 18 wherein said second winding has approximately one-fourth the turns of said first winding.

22. The combination according to claim 18 wherein the wire size for said first and second windings is substantially equal.

23. The combination according to claim 18 wherein the parameters of said first and second windings are selected to cause the stator magnetic flux density to be substantially at saturation during normal load conditions of operation of said motor.

24. The combination according to claim 1 wherein said second capacitor means is an electrolytic capacitor.

* * * * *